United States Patent
Ahn

(10) Patent No.: US 7,259,925 B1
(45) Date of Patent: Aug. 21, 2007

(54) OPTICAL POWER SWITCH

(75) Inventor: Byong H. Ahn, Springfield, VA (US)

(73) Assignee: United States of America as Represented by the Department of the Army, Washington, DC (US)

( * ) Notice: Subject to any disclaimer, the term of this patent is extended or adjusted under 35 U.S.C. 154(b) by 0 days.

(21) Appl. No.: 07/431,170

(22) Filed: Oct. 20, 1989

(51) Int. Cl.
*G02B 7/00* (2006.01)

(52) U.S. Cl. .................................................. 359/886

(58) Field of Classification Search ................ 350/313, 350/314, 316; 332/7.51; 359/886, 40, 45, 359/66, 71, 222
See application file for complete search history.

(56) References Cited

U.S. PATENT DOCUMENTS

| | | | | |
|---|---|---|---|---|
| 3,267,807 A | * | 8/1966 | Swope et al. | 350/316 |
| 3,552,824 A | * | 1/1971 | Kiss | 350/314 |
| 3,623,797 A | * | 11/1971 | Daw | 350/312 |
| 4,283,113 A | * | 8/1981 | Eden | 350/354 |
| 4,723,841 A | * | 2/1988 | Roy et al. | 350/359 |
| 5,561,541 A | * | 10/1996 | Sharp et al. | 349/104 |

FOREIGN PATENT DOCUMENTS

| | | | |
|---|---|---|---|
| EP | 303836 | * | 2/1989 |
| GB | 1208213 | * | 10/1970 |

OTHER PUBLICATIONS

Bobb, L.; "Active Optical Filter"; NTIS AP-0006403/0, filed May 30, 1979, pp. 1-10, Dept. of Army.*
Orr et al; "Vo$_2$ Protective Devices"; NTIS AO-A2120181, 6/XAB; Jun. 1989, pp. 1-33, Tech Report.*
Khoo, R C.; "Optical Thermal Induced . . . Interface"; Appl. Phys. Lett., vol. 40, #8, Apr. 15, 1982; pp. 645-647.*

* cited by examiner

*Primary Examiner*—Deandra M Hughes
(74) *Attorney, Agent, or Firm*—Andrew Romero

(57) ABSTRACT

The present invention provides a protective device for sensitive infrared sensors as Forward Looking Infrared imagers (FLIRs). A prior device using materials with higher order susceptibilities to electric polarization, which provides protection against extremely intense radiation from high-power lasers is combined with a low energy optical power limiters such as the chalcogenide glass and the vanadium dioxide which respond reversibly to infrared radiation.

13 Claims, 1 Drawing Sheet

OPTICAL POWER SWITCH

The invention described herein may be manufactured, used, and licensed by the U.S. Government for governmental purposes without the payment of any royalties thereon.

BACKGROUND OF INVENTION

1. Field

This invention pertains to optical radiation limiters used as protective devices for imaging devices such as the FLIR (Forward Looking Infrared Imager).

2. Prior Art

Far infrared imagers must be highly sensitive in order to operate with the small temperature differentials that define many targets. Because of their sensitivity and the material used for such detector elements, e.g. mercury cadmium telluride, they are highly vulnerable to damage from low energy threat laser radiation. In an earlier patent application entitled, "Frustrated Total Internal Reflection Optical Power Limiter (FTIR)", Ser. No. 648,140, a high energy protective device, using, e.g. nematic liquid crystals, is described, which limits the input radiation, if it exceeds a certain level, thus protecting the detector elements.

The detector material is damaged at an input fluence of between 2 and 7 $J/cm^2$ a level easily achieved by commercially available $CO_2$ lasers. The FTIR device has not yet been fabricated that can fully protect the detector materials in a system configuration. There are chalcogenide and vanadium oxide materials, however, that can be triggered at lower range fluence levels such that they can protect the detector material. When used alone, however, protective devices made from these materials suffer from too low a dynamic range.

An object of this invention is to extend the protection range of a device in the earlier mentioned application above, in order to close the vulnerability window, by adding a different class of light sensitive materials, similar to those mentioned above, to lower the switching threshold of the FTIR while maintaining the upper limit of the dynamic range.

SUMMARY OF THE INVENTION

The invention involves the combination of nonlinear optical limiter elements, FTIR, with a more light sensitive optical power limiter such as a chalcogenide glass device or a vanadium oxide device. At very low input levels, the device transmits the radiation with little attenuation. At somewhat higher levels, the more light sensitive device is activated, attenuating the input radiation by absorption in a chalcogenide device or by reflection in a vanadium oxide device thus protecting the detector elements at such levels. At very high levels, the FTIR is activated and the input radiation is completely reflected, thus protecting the chalcogenide or vanadium oxide switch and the detector elements at those levels. By combining the two devices in series, the resultant device has a low switching threshold with a high dynamic range, the properties of each device complimenting one another.

DESCRIPTION OF THE PREFERRED EMBODIMENT

Figure 1:
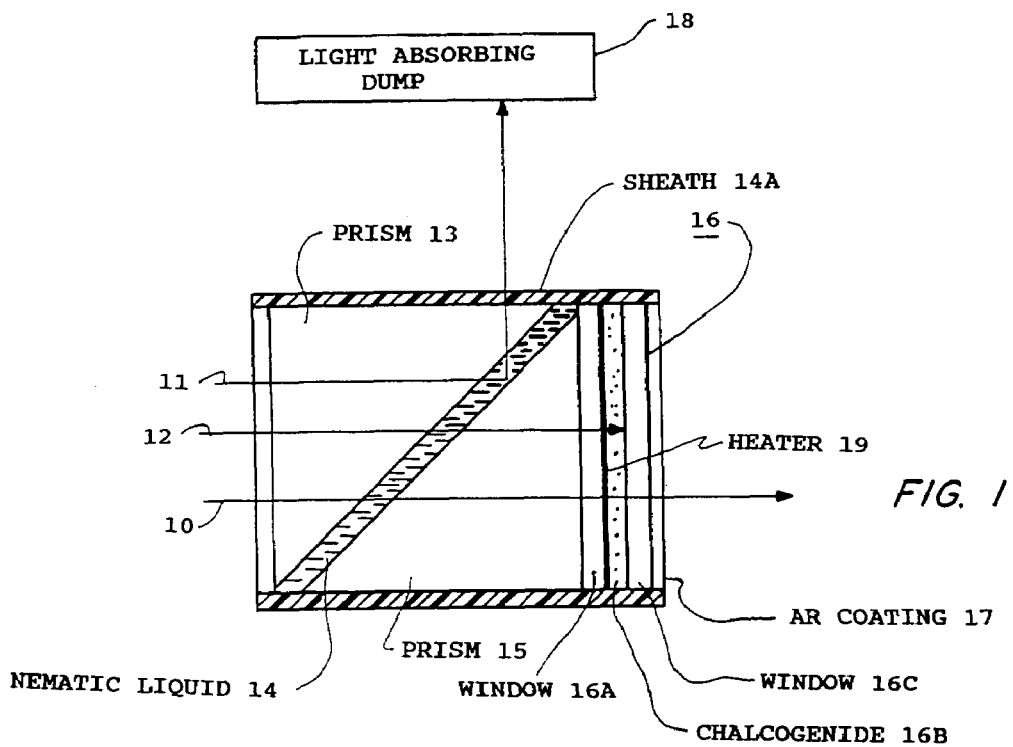

FIG. 1 shows a detailed view of a first embodiment of applicant's novel protective device. This device utilizes a high power limiter such as one disclosed in an earlier application entitled Frustrated Total Internal Reflection Power Limiter, Ser. No. 648,140 filed 5 Sep. 1984. As disclosed in that application, the limiter must be located at an intermediate focal point, which can be created by adding beam folding mirrors to a first generation FLIR, but which is an integral feature of second generation FLIRS. A similar device is disclosed in Ser. No. 268,461 "Optical Power Limiter Utilizing Nonlinear Refraction", filed 1 Nov. 1989 by Gary L. Wood, et al. The operation of the components, 13, 14, 15, and 17 are essentially described in the earlier patent applications. For example, a low/intensity ray 10, representing ambient IR levels at which the FLIR detector is designed to operate is transmitted undeviated and substantially unattenuated through the protective limiter device. The former limiters were composed of two solid elements 13 and 15 between which is a space or a layer of liquid 14 sealed by a sheath 14A. An anti-reflective coating 17 is placed on the output face and usually will be also placed on the input face, as well. All of these elements are transparent to IR, but some exhibit optical transmission changes under very intense IR radiation, such that a ray 11 of such radiation is redirected to an absorbing dump 18. Dump 18 may be a bulk absorbing material mounted on the housing of the FLIR. The present invention improves this device by adding a low power limiter element 16 to the output face before applying the anti-reflective coating. This limiter element consists of layers 16A, 16B and 16C, 16B being the active chalcogenide layer. Sheath 14A is extended to cover the edges of these added layers. Layers 16A and 16C are merely windows transparent to far-infrared which, with sheath 14A or some equivalent, encapsulate the toxic chalcogenide. If the input intensity is increased to a much higher level, represented by ray 11, it is reflected by the FTIR device because of the nonlinearity of components 13, 14, and 15 and is absorbed by the dump device 18.

As the input intensity is increased above the level represented by ray 10 but held below the level for ray 11, there is a window of vulnerability for the detector damage. Namely, the input intensity is high enough to damage the detector material, but low enough not to trigger the FTIR. The device 16 is triggered at a characteristic threshold below the level of the detector damage. The exact level of this threshold is not critical and many chalcogenide materials with suitable thresholds are now available. The device absorbs almost all the input radiation, other than the small portion of the radiation which passes through the device before the onset of the energy limiting. It will continue to function, as long as the level of the input radiation remains higher than threshold or is increased, until the FTIR is triggered.

Figure 2:
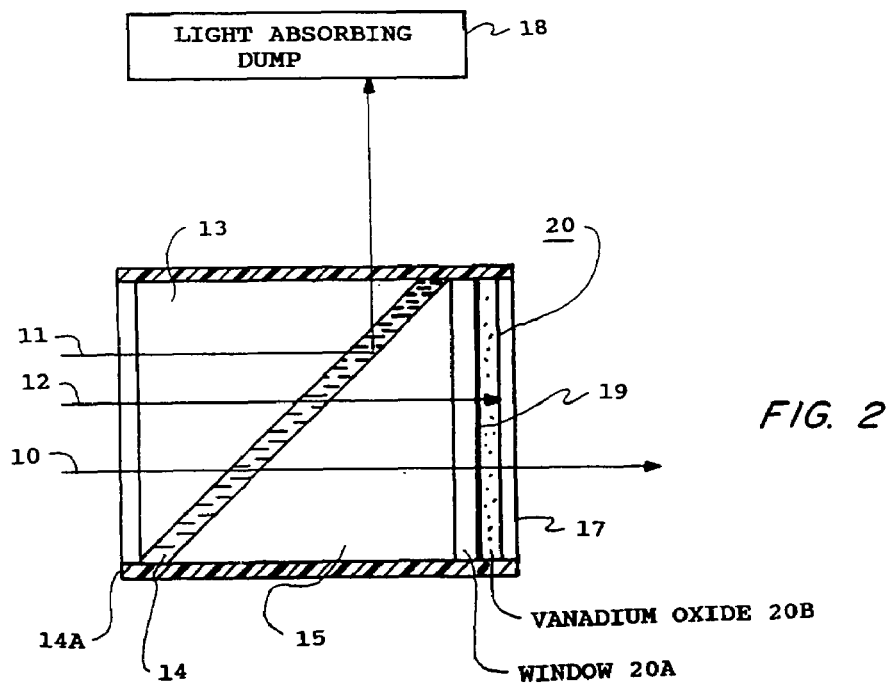

FIG. 2 shows a somewhat simpler device for the same purpose. Again, a low power limiter 20 is mounted on the output face before applying the anti-reflective coating 17. This limiter has only two layers 20A and 20B, 20B being the active layer formed from vanadium oxide. The characteristic threshold may be varied by varying the metal to oxide ratio, pure vanadium dioxide being a suitable choice for current FLIRS. Layer 20A is germanium or other material transparent to far-infrared having sufficient strength to support the vanadium oxide. The anti-reflection layer 17 may be deposited on the vanadium oxide, as before. When layer 20B is formed from vanadium oxide or vanadium dioxide, instead of the chalcogenide, there is provided another type of low energy switching device. In this device, the input radiation is reflected by the vanadium oxide above the characteristic threshold. In other words, the device changes from a transmissive device into a reflective device, as the level of input radiation is increased, above ambient levels. It reflects most of the input radiation, except for the very small portion of radiation that passes through the device before the onset of the energy reflection. The reflected radiation from layer 20B also facilitiates the switching of elements 13, 14, and 15. The characteristic threshold can be normally too high and may be lowered, if desired, by heating either the chalcogenide or the vanadium dioxide by means of an electrical heating element in, on or around the window 16A or 20A, respectively. This would allow the FLIR to operate to its fullest potential. A thin resistive structure or coating 19 between the window and the protection layer 16B or 20B and, transparent to IR is preferable as the heating element.

The detector element is protected by the chalcogenide or vanadium dioxide device, which in turn is protected by the FTIR device. In this configuration, the window of vulnerability of the FTIR device is closed by the addition of the low energy switching device, such as the chalcogenide device and the vanadium dioxide device.

The protective elements may be bonded together and mounted in the imaging module of FLIRs using ordinary mounting brackets, materials and techniques well known in the optical art.

I claim:

1. A first protective device for the compound semiconductors detectors in an IR imager comprising of:
    a first nonlinear frustrated total internal reflection protective means, mounted in the optical path within said imager at an intermediate focal point configured for intercepting all input radiation above a high intensity damage threshold value for said detectors; and
    a second phase transition type protective means mounted in the optical path adjacent the output of said first means configured to intercept only input radiation having intensities over a range that includes said damage threshold value and the lowest value intercepted by said first protective means.

2. A protective device according to claim 1, wherein:
    said second means absorbs only said input radiation at and above said damage threshold value.

3. A protective device according to claim 1, wherein:
    said second means reflects only said input radiation at or slightly above said damage threshold value.

4. A protective device according to claim 1, wherein:
    said second means includes a layer of chalgocenide glass.

5. A protective device according to claim 1, wherein:
    said second means includes a layer of vanadium oxide.

6. A protective device according to claim 1, wherein:
    said device includes an electrical means to heat said second protective means.

7. A first protective device for the compound semiconductors detectors in an IR imager comprising of:
    a first nonlinear frustrated total internal reflection protective means, mounted in the optical path within said imager at an intermediate focal point configured for intercepting all input radiation above a high intensity damage threshold value for said detectors; and
    a second phase transition type protective means mounted adjacent the output of said first means configured to intercept only input radiation having intensities over a range that includes said damage threshold value and the lowest value intercepted by said first protective means,
    wherein said second means is configured to reflect only said input radiation at or slightly above said damage threshold value.

8. A first protective device for the compound semiconductors detectors in an IR imager comprising of:
    a first nonlinear frustrated total internal reflection protective means, mounted in the optical path within said imager at an intermediate focal point configured for intercepting all input radiation above a high intensity damage threshold value for said detectors; and
    a second phase transition type protective means mounted adjacent the output of said first means configured to intercept only input radiation having intensities over a range that includes said damage threshold value and the lowest value intercepted by said first protective means,
    wherein said second means includes a layer of chalgocenide glass.

9. A first protective device for the compound semiconductors detectors in an IR imager comprising of:
    a first nonlinear frustrated total internal reflection protective means, mounted in the optical path within said imager at an intermediate focal point configured for intercepting all input radiation above a high intensity damage threshold value for said detectors; and
    a second phase transition type protective means mounted adjacent the output of said first means configured to intercept only input radiation having intensities over a range that includes said damage threshold value and the lowest value intercepted by said first protective means,
    wherein said second means includes a layer of vanadium oxide.

10. A first protective device for the compound semiconductors detectors in an IR imager comprising of:
    a first nonlinear frustrated total internal reflection protective means, mounted in the optical path within said imager at an intermediate focal point configured for intercepting all input radiation above a high intensity damage threshold value for said detectors; and
    a second phase transition type protective means mounted adjacent the output of said first means configured to intercept only input radiation having intensities over a range that includes said damage threshold value and the lowest value intercepted by said first protective means,
    wherein said device includes an electrical means to heat said second protective means.

11. A protective device according to claim 7, wherein:
    said device includes an electrical means to heat said second protective means.

12. A protective device according to claim 8, wherein:
    said device includes an electrical means to heat said second protective means.

13. A protective device according to claim 9, wherein:
    said device includes an electrical means to heat said second protective means.

* * * * *